(12) United States Patent
Fonseca, Jr. et al.

(10) Patent No.: US 7,463,612 B2
(45) Date of Patent: Dec. 9, 2008

(54) METHOD AND APPARATUS FOR ROUTE DISCOVERY WITHIN A COMMUNICATION SYSTEM

(75) Inventors: Benedito J. Fonseca, Jr., Lombard, IL (US); Jeffrey D Bonta, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 596 days.

(21) Appl. No.: 10/967,503

(22) Filed: Oct. 18, 2004

(65) Prior Publication Data

US 2005/0094576 A1     May 5, 2005

Related U.S. Application Data

(60) Provisional application No. 60/515,589, filed on Oct. 30, 2003.

(51) Int. Cl.
*H04Q 7/24* (2006.01)
*H04L 12/28* (2006.01)

(52) U.S. Cl. ........................................ 370/338; 370/351
(58) Field of Classification Search ........................ None
See application file for complete search history.

(56) References Cited

U.S. PATENT DOCUMENTS

| | | | | |
|---|---|---|---|---|
| 5,490,139 | A * | 2/1996 | Baker et al. | 370/312 |
| 5,612,957 | A | 3/1997 | Gregerson et al. | |
| 6,304,556 | B1 | 10/2001 | Haas | |
| 6,704,293 | B1 | 3/2004 | Larsson et al. | |
| 6,810,428 | B1 | 10/2004 | Larsen et al. | |
| 6,961,310 | B2 * | 11/2005 | Cain | 370/238 |
| 2001/0036810 | A1 | 11/2001 | Larsen | |
| 2002/0145978 | A1 | 10/2002 | Batsell et al. | |
| 2002/0163912 | A1 | 11/2002 | Carlson | |
| 2003/0033394 | A1 | 2/2003 | Stine | |
| 2003/0068975 | A1 * | 4/2003 | Qiao et al. | 455/11.1 |
| 2003/0202477 | A1 | 10/2003 | Zhen et al. | |
| 2003/0204625 | A1 | 10/2003 | Cain | |
| 2004/0029553 | A1 | 2/2004 | Cain | |
| 2005/0037789 | A1 * | 2/2005 | Rhee et al. | 455/507 |
| 2005/0078672 | A1 * | 4/2005 | Caliskan et al. | 370/389 |
| 2006/0040670 | A1 * | 2/2006 | Li et al. | 455/445 |

FOREIGN PATENT DOCUMENTS

| | | |
|---|---|---|
| EP | 1 289 197 A1 | 3/2003 |
| WO | WO 02/39710 A1 | 5/2002 |

OTHER PUBLICATIONS

Vaydia; "Mobile Ad Hoc Networks: Routing, MAC and Transport Issues"; tutorial presented at 2001 Mobicom.
Ko, Vaydia; "Location-Aided Routing in Mobile Ad Hoc Networks", ACM Wireless Networks 6, 2000.

(Continued)

*Primary Examiner*—Wing F Chan
*Assistant Examiner*—Eunsook Choi

(57) ABSTRACT

A communication system (100) is provided that comprises an overlay communication system and an underlay ad-hoc communication system. Route discovery in the ad-hoc communication system takes place by notifying the overlay communication system of the source and destination nodes. The overlay communication system instructs all base stations between the source and destination nodes to instruct all nodes to participate in route discovery.

10 Claims, 3 Drawing Sheets

OTHER PUBLICATIONS

Basagni; "A Distance Routing Effect Algorithm for Mobility (DREAM)", in ACM/IEEE Int. Conf on Mobile Computing and Networking, pp. 76-84, Oct. 1998.

Stojmenovic; "GEDIR: Loop-free Location Based Routing in Wireless Networks", ASTED Int. Conf. On Parallel and Distributed Computing and Systems, Nov. 1999.

Castaneda; "Query Localization Techniques for On-Demand Routing Protocols in Ad Hoc Networks", Mobicom' 99.

Bhargava; "Integrating Heterogeneous Wireless Technologies: A Cellular Aided Mobile Ad Hoc Network (CAMA)"; Purdue University (submitted for publication). Sep. 24, 2008.

Johnson, "Dynamic Source Routing (DSR) in ad hoc wireless networks", Mobile Computing, Kluwere Academic Publishers, 1994.

* cited by examiner

METHOD AND APPARATUS FOR ROUTE DISCOVERY WITHIN A COMMUNICATION SYSTEM

REFERENCE TO RELATED APPLICATION

The present application claims priority from provisional application, Ser. No. 60/515,589, entitled "METHOD AND APPARATUS FOR ROUTE DISCOVERY WITHIN A COMMUNICATION SYSTEM," filed Oct. 30, 2003, which is commonly owned and incorporated herein by reference in its entirety.

This application is related to a co-pending application, Ser. No. 10/603,558, entitled "METHOD AND APPARATUS FOR ROUTE DISCOVERY WITHIN A COMMUNICATION SYSTEM," filed Jun. 25, 2003, which is assigned to the assignee of the present application.

FIELD OF THE INVENTION

The present invention relates generally to communication systems and in particular, to a method and apparatus for route discovery within such communication systems.

BACKGROUND OF THE INVENTION

Route discovery within a communication system is well known. In particular, a message flooding procedure occurs that is often the basis of on-demand route discovery and network initialization. Message flooding is basically defined as a broadcast procedure covering a complete network. It operates as follows: When a node, or remote unit, in a network wishes to discover a route to another node in the network a message is broadcasted to all of its neighbors specifying the destination address. Upon receiving the message, all of the neighboring nodes will rebroadcast the message to their neighbors. When a node receives the same message again, it discards it. The procedure repeats itself until all of the nodes in the network are reached, or a time-to-live for the message expires. As discussed, the purpose to flood the network in a routing algorithm is essentially to find a path to send data to destinations. The message content is usually a request of route discovery.

Although message flooding is a dependable way to find a route within the network, flooding is proven to generate excessive amounts of system traffic and interference. In particular, the exponential increase of the signaling messages, due to the fact that every host in the searched area has the obligation to rebroadcast the route-discovery packet, leads to serious redundancy, contention, and collision. Therefore, a need exists for a method and apparatus for route discovery within a communication system that minimizes system interference caused by message flooding.

DETAILED DESCRIPTION OF THE DRAWINGS

Figure 1:
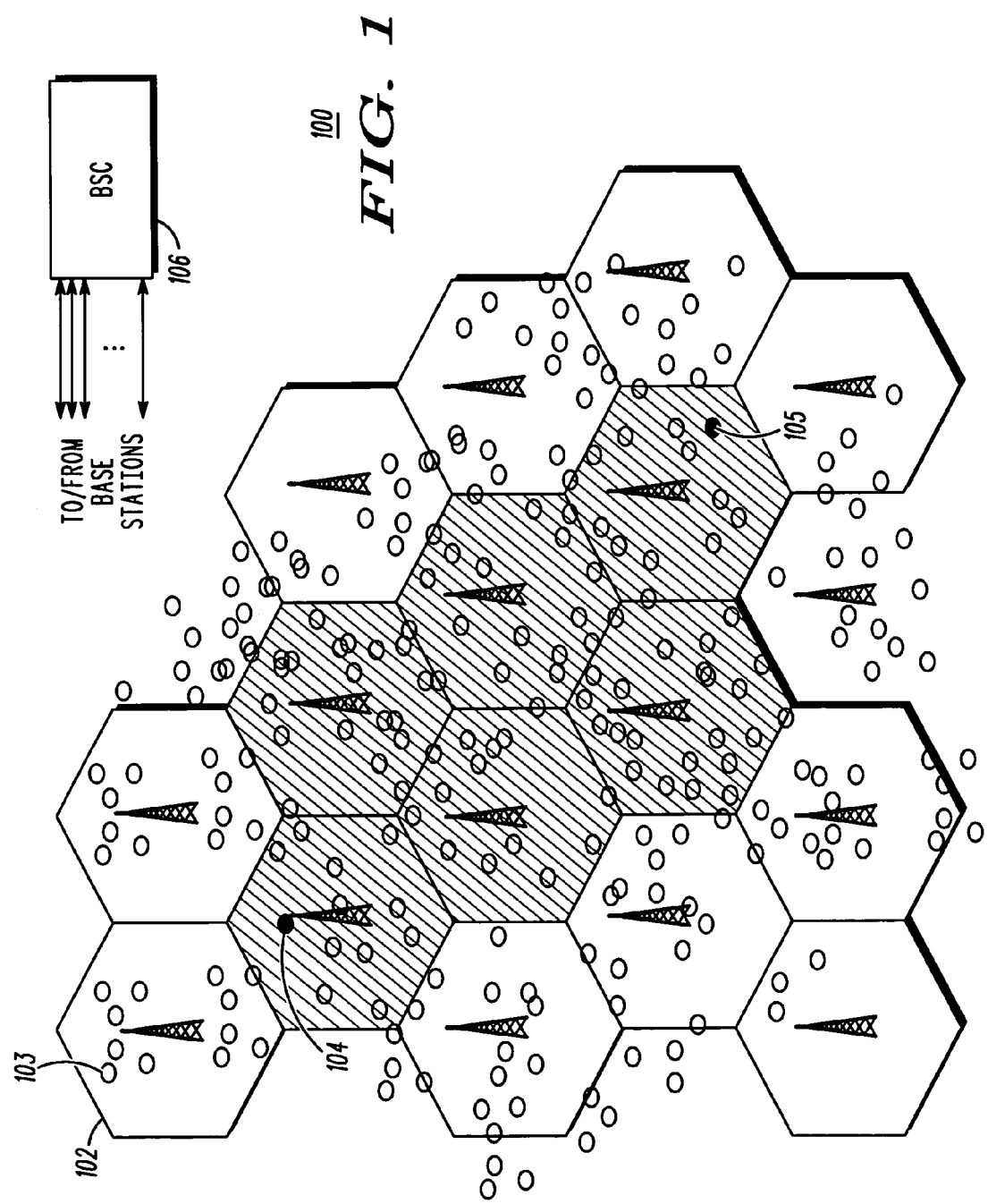
FIG. 1 is a block diagram of a communication system.

To address the need for route discovery within a communication system, a communication system (100) is provided that comprises an overlay communication system and an underlay ad-hoc communication system. Route discovery in the ad-hoc communication system takes place by notifying the overlay communication system of the source and destination nodes. The overlay communication system instructs all base stations between the source and destination nodes to instruct all nodes to participate in route discovery.

Because only certain nodes will participate in flooding, the flood of RT_DISC messages would happen only in the direction of the destination node. This greatly reduces the amount of flooding within communication system 100. Additionally, the above-flooding procedure does not impose any limits on capacity or latency of the ad-hoc network; therefore, the ad-hoc network formed between stations can be very large.

The present invention encompasses a method for route discovery between a source node and a destination node within an ad-hoc communication system. The method comprises the steps of receiving a route discovery request from the source node, locating a source base station and a destination base station serving the source node and the destination node, and determining intervening base stations between the source and the destination base stations. Intervening nodes in communication with the intervening base stations are instructed to participate in route discovery.

The present invention additionally encompasses a method for flooding within an underlay communication system. The method comprises the steps of receiving a notification message instructing a node to participate in route discovery, wherein the notification message comprises a first session identification, receiving a route-discovery message comprising a second session identification, and determining if the first session identification matches the second session identification. The route-discovery message is forwarded based on whether the first session identification matches the second session identification.

The present invention additionally encompasses a method for route discovery within an ad-hoc communication system. The method comprises the steps of receiving a flood message, determining that a particular node within an ad-hoc communication system is out of cellular coverage, and rebroadcasting the flood message with an indication that the node is out of cellular coverage based on the determination that the particular node is out of cellular coverage.

The present invention additionally encompasses a route-discovery message comprising a source address, a destination address, and a session identification that identifies a particular route/destination combination.

The present invention additionally encompasses an apparatus comprising a receiver receiving a route discovery request from a node in an underlay communication system to communicate with a destination node within the underlay communication system, logic circuitry locating the source and the destination node, and determining intervening base stations between the source and the destination nodes, and a transmitter transmitting instructions instructing intervening nodes in communication with the intervening base stations to participate in route discovery.

Finally, the present invention additionally encompasses an apparatus comprising a receiver receiving a notification message instructing a node to participate in route discovery, wherein the notification message comprises a first session identification, the receiver also receiving a route-discovery message comprising a second session identification, logic circuitry determining if the first session identification matches the second session identification, and a transmitter forwarding the route-discovery message based on whether the first session identification matches the second session identification.

Turning now to the drawings, wherein like numerals designate like components, FIG. 1 is a block diagram of communication system 100. Communication system 100 comprises an ad-hoc underlay communication system comprising a plurality of nodes 103. The underlay communication system is preferably a neuRFon™ communication system available from Motorola, Inc. that is modified to perform the functionality set forth below. However, in alternate embodiments of the present invention, the underlay communication system may comprise any ad-hoc network, such as, but not limited to a WLAN network typically utilizing IEEE 802.11b ad hoc networking protocols or a RoofTop™ Wireless Routing mesh network manufactured by Nokia, Inc. As one of ordinary skill in the art will recognize, each node 103 within the underlay Communication system 100 additionally comprises an overlay communication system such as a cellular communication system. The overlay communication system comprises a plurality of transceivers 101, with transceivers 101 being adapted to communicate with nodes 103 that are within communication range. Transceivers 101 are all in communication with base station controller (BSC) 106. In the preferred embodiment of the present invention transceivers 101 are preferably cellular base stations, each having an associated coverage area 102 however, in alternate embodiments, transceivers 101 may comprise other transmission/reception equipment such as beacons. Additionally BSC 106 serves to link base stations 101 so that communication between base stations can be achieved. Although not shown, it is envisioned that cellular base stations 101 are simultaneously in communication with nodes 103 within the ad-hoc network.

As one of ordinary skill in the art will recognize, transmissions between two nodes within the underlay communication system generally take place through intervening nodes, with the intervening nodes receiving a source transmission, and "repeating" the source transmission until the source transmission reaches its destination node. Thus, a first node (e.g., node 104), wishing to transmit information to a second node (e.g., node 105), must first determine a route (i.e., those intervening nodes) between the first and the second node. In prior-art systems, this is accomplished via message flooding.

As discussed above, message flooding is a dependable way to find a path within communication system 100, however, flooding generates an excessive amount of system interference. In order to address this issue, in the preferred embodiment of the present invention the overlay communication system aids in route determination for the underlay communication system. In particular, when a first node within the underlay communication system desires to determine route information to a second node, the first node transmits a route-needed (RT_NEED) to a transceiver within the overlay communication system. The route-needed message notifies the overlay communication system of the desire to determine a route from the first node (source) to the second node (destination) and comprises the identity of both the first node and the second node.

Once an overlay transceiver (referred to as a source cellular base station) receives the route needed message, the message is passed onto Base Station Controller (BSC) 106 where BSC 106 determines the destination nodes general location by determining which base station 101 (referred to as a destination cellular base station) that the destination node is closest to. This is accomplished utilizing location area information collected during location updates from cellular subscribers when they register their location with the nearest base station.

Once gross location for the destination node is determined, BSC 106 determines a plurality of intervening base stations 101 that exist between the source cellular base station and the destination cellular base station. BSC 106 then instructs the source base station, destination cellular base station, and all intervening base stations to broadcast a notification (NOTIF) message to nodes 103 within their coverage area (shaded area in FIG. 1). The notification message notifies nodes 103 to participate in route discovery between the source node and the destination node by repeating any flood, or route discovery (RT_DISC) message attempting to discover the route between the source and the destination nodes.

Figure 2:
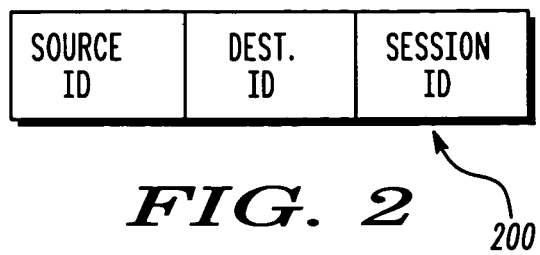
FIG. 2 illustrates a notification message

Since there may be concurrent ad-hoc route discovery procedures, cells/sectors from outside a Flooding Region could be part of other Flooding Regions, in which the nodes located in such cells would also be listening for RT_DISC messages and could potentially re-broadcast RT_DISC messages originated in neighboring regions. To avoid this problem, the cellular network would broadcast a specific session identification in the NOTIF message that uniquely identifies the route. Thus, as shown in FIG. 2, the NOTIF message comprises the source node identification, the destination node identification, and the session identification. Nodes in the ad-hoc network would only re-broadcast the RT_DISC messages if the route identifier matches the one broadcasted by the cellular network in the NOTIF message. By using specific route identifier for each flooding procedure, the flood of RT_DISC messages is guaranteed to be restrained to just the cells/sectors in between Sender and Destination stations. It should be noted that if the node is participating in more than 1 ad-hoc route discovery procedure, it would store the session identification of all discovery procedures.

Once a NOTIF message is received by a node 103, the node 103 immediately awakes and monitors for route discovery (RT_DISC) messages comprising the particular route identifier. Normal flooding protocols then take place with only those nodes that received the NOTIF message having the particular route identifier participating in the flooding procedure.

When the source node 103 receives the NOTIF message having the particular route identifier, it immediately begins a flooding procedure by broadcasting the RT_DISC message (containing the route identifier) in order to identify the route between the source and the destination nodes. Upon receiving the RT_DISC message, all of the neighboring nodes will rebroadcast the message to their neighbors. The procedure repeats itself until all of the nodes in the network are reached, or a time-to-live for the message expires. This results in the destination node determining route information to the source node by analyzing the RT_DISC message to determine those nodes intervening between the source and the destination node. The route information comprises information such as a sequence of intervening IP addresses corresponding to each node from the first node to the second node.

In the preferred embodiment of the present invention route information is passed back to BSC 106 by the destination node transmitting this information to the destination base station. The route information may comprise several routes. BSC 106 then can determine a best route between the source and the destination node. These routes can be based on various criteria, such as, but not limited to routes having:

a shortest path between the source and the destination nodes,
  a fewest intervening nodes between the source and the destination nodes, and intervening nodes having a greatest amount of battery power.

The best route is eventually provided to the source node so that communication can be achieved between the source and the destination nodes. Alternatively, route information may be passed to at least one node in the underlay communication system participating in communication between the source and the destination node. This route information may simply comprise "next hop" information for a node participating in the communication, where the "next hop" is simply a node's address to pass communication.

Because only certain nodes will participate in flooding, the flood of RT_DISC messages would happen only in the direction of the destination node. This greatly reduces the amount of flooding within communication system 100. Additionally, the above-flooding procedure does not impose any limits on capacity or latency of the ad-hoc network; therefore, the ad-hoc network formed between stations can be very large.

Figure 3:
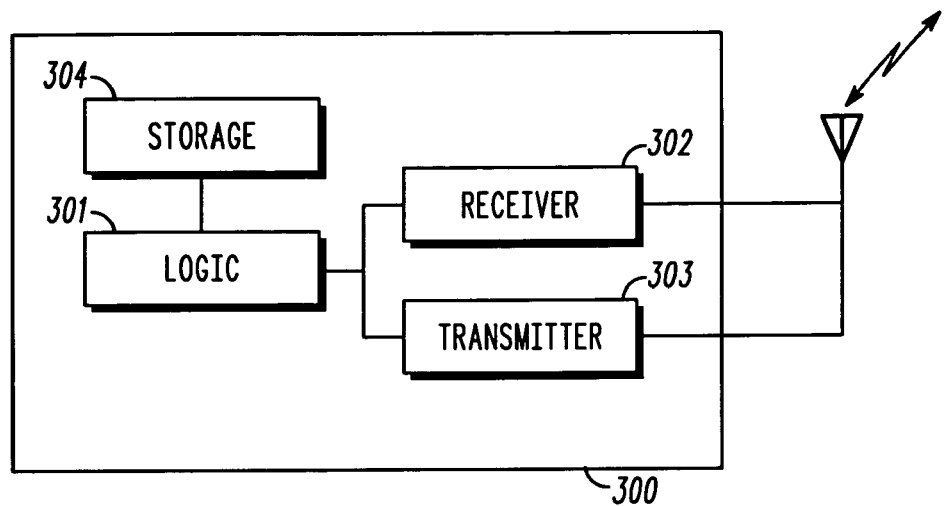
FIG. 3 is a block diagram of a transceiver.

FIG. 3 is a block diagram of transceiver 300 in accordance with the preferred embodiment of the present invention. In the preferred embodiment of the present invention all nodes 103 and transceivers 101 contain the elements shown in transceiver 300. As shown, transceiver 300 comprises logic circuitry 301, receive circuitry 302, transmit circuitry 303, and storage 304. For simplicity, transceiver 300 is shown having a single transmitter 302 and receiver 303, however, one of ordinary skill in the art will recognize that transceiver 300 will comprise multiple transmitters and receivers for communication via the overlay network and the ad hoc network.

Continuing, logic circuitry 301 preferably comprises a microprocessor controller, such as, but not limited to a Motorola PowerPC microprocessor. Logic circuitry 301 serves as means for controlling transceiver 300, means for analyzing message content to determine any actions needed, means for locating nodes in the underlay communication system, and means for determining route information between nodes. Additionally receive and transmit circuitry 302-303 are common circuitry known in the art for communication utilizing a well known communication protocol, and serve as means for transmitting and receiving messages. For example, for underlay nodes 103, receiver 302 and transmitter 303 are well known neuRFon™ elements that utilize the neuRFon™ communication system protocol. Other possible transmitters and receivers include, but are not limited to transceivers utilizing Bluetooth, IEEE 802.11, or HyperLAN protocols. Similarly, for transceivers 101, receiver 302 and transmitter 303 are well known elements that utilize the overlay communication system protocol (e.g., CDMA, TDMA, GSM, WCDMA, ..., etc.).

Transceiver 300 may serve as:
  a node wishing to discover a route to another node,
  a node aiding in route discovery between two differing nodes,
  a transceiver in an overlay communication system participating in route discovery as a source base station, destination base station, or as an intervening cellular base station.

Figure 4:
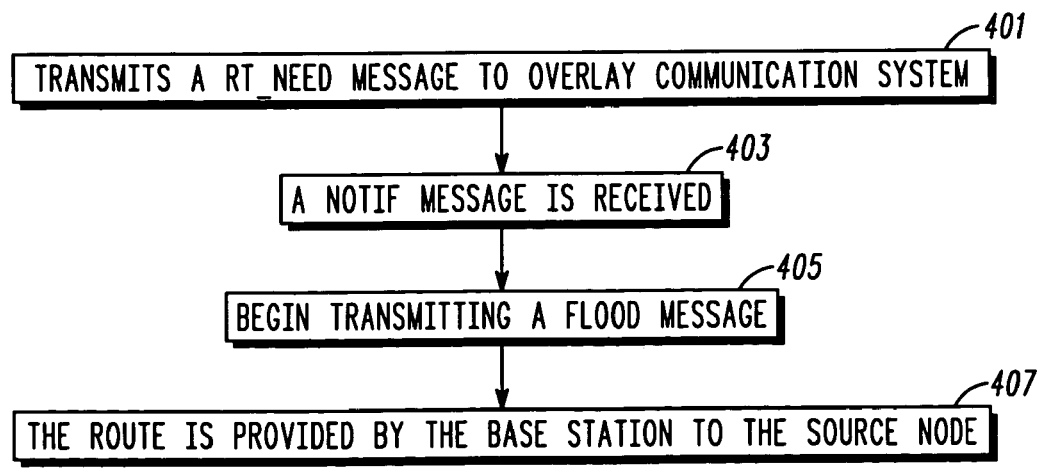
FIG. 4 is a flow chart showing operation of a node acting as a source node that wishes to discover a route to a destination node.
Figure 5:
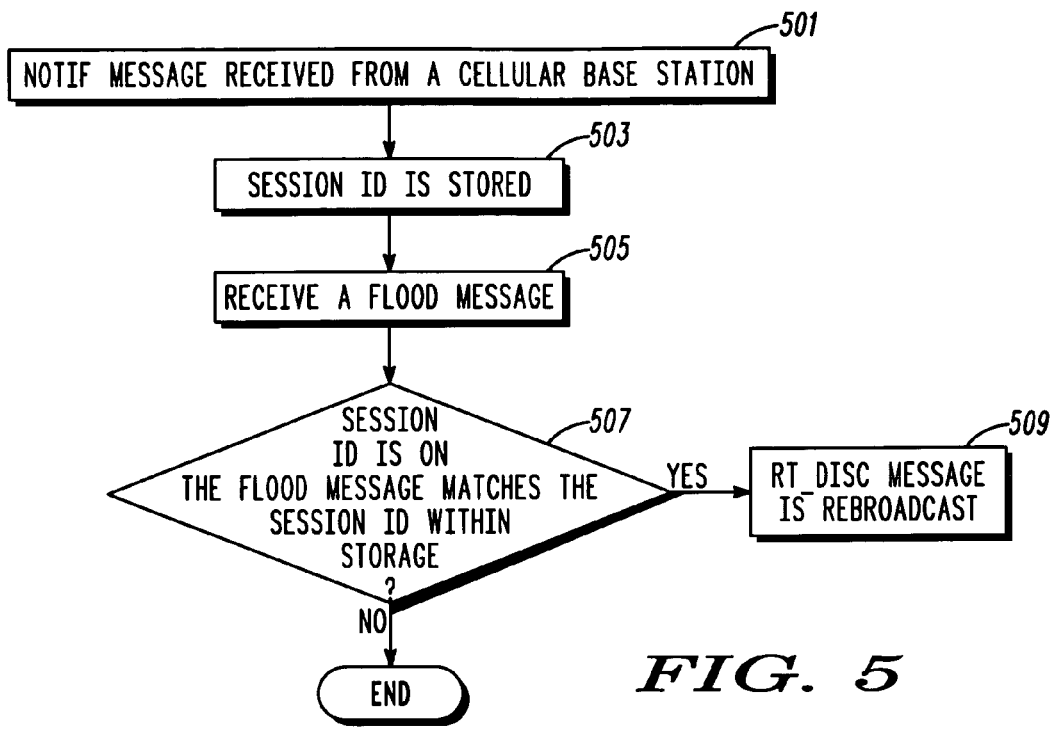
FIG. 5 is a flow chart showing operation of a node aiding in route discovery.
Figure 6:
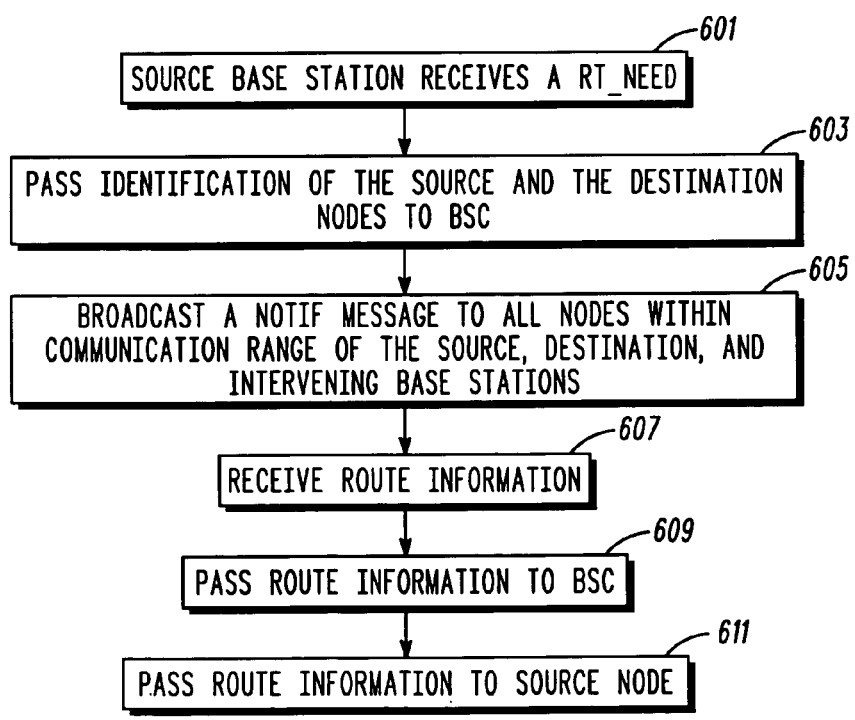
FIG. 6 is a flow chart showing operation of an overlay communication system.

Flow charts detailing operation of transceiver 300 for these three scenarios are shown in FIG. 4 through FIG. 6.

FIG. 4 is a flow chart showing operation of node 300 acting as a source node that wishes to discover a route to a destination node. It should be noted that all nodes within the ad-hoc system are in a standby mode in that the node performs basically two operations. Firstly, receiver 302 periodically checks to determine whether it is being paged, and secondly, performs location updates when required (this is the normal Cellular Location update procedure and happens just when moving from one location area to another.).

The logic flow begins at step 401 where the source node, utilizing transmitter 301, transmits a RT_NEED message to overlay communication system informing the overlay communication system of the need to discover a route between the source node (first node) and a destination node (second node). As discussed above, the RT_NEED message comprises the identification of both the source and the destination nodes. This causes the overlay communication system to instruct all nodes in intervening cells to listen for flood messages as part of the route-discovery process. Thus, at step 403, a NOTIF message is received by receiver 302 via a cellular communication channel. This triggers logic 301 to activate receiver 302 and transmitter 303 enabling ad hoc network communication.

As discussed above, the NOTIF message contains a unique route identifier, or session ID identifying the route trying to be determined. Because the first node was the node that sent the RT_NEED message, once the NOTIF message is received, the node immediately begins transmitting a flood message (RT_DISC) at step 405 utilizing the ad hoc network communication channel. As discussed above, the flood message contains the unique session ID. The flood message propagates throughout the ad-hoc network via normal flooding procedures. Considering that enough user density is present in the Flooding Region, the RT_DISC message will eventually reach the destination node, causing the destination node to send an ADHOC_PATH_FOUND to its serving base station. This message indicates that a path was found and contains the ID of all stations that are in the path. Finally, at step 407 the route is provided by the base station to the source node.

FIG. 5 is a flow chart showing operation of a node aiding in route discovery. The logic flow begins at step 501 where receiver 302 receives a NOTIF message from a cellular base station. As discussed above, the NOTIF message indicates that a node within the ad-hoc network wishes to perform route discovery, and instructs the receiver of the NOTIF message to participate in route discovery. The NOTIF message comprises a unique session ID for the route. The session ID is stored by logic circuitry 301 in storage 304 (step 503). At step 505 the node receives a flood message (RT_DISC), and at step 507 the logic circuitry 301 determines if the session ID on the flood message matches the session ID within storage 304. As discussed above, since there may be concurrent ad-hoc route discovery procedures, cells/sectors from outside a Flooding Region could be part of other Flooding Regions, in which the nodes located in such cells would also be listening for RT_DISC messages and could potentially re-broadcast RT_DISC messages originated in neighboring regions. To avoid this problem, the cellular network would broadcast a specific session identification in the NOTIF message that uniquely identifies the route. Nodes in the ad-hoc network would only re-broadcast the RT_DISC messages if the route identifier matches the one broadcasted by the cellular network in the NOTIF message. Thus, if at step 507, the session ID matches, the logic flow continues to step 509 where the RT_DISC message is rebroadcast by transmitter 303 as part of standard flooding techniques, otherwise the logic flow ends at step 511. However, if node 103 is participating in several route discovery procedures, it would only go to step 511 after it has rebroadcast the RT_DISC of all routes being discovered or if all corresponding timers had expired.

FIG. 6 is a flow chart showing operation of the overlay communication system. As discussed above, the overlay communication system comprises a plurality of cellular base stations, each capable of acting as a source, destination, or intervening base station. The logic flow begins at step 601 where a receiver within a source base station receives a route discovery request (RT_NEED message) from a source node indicating that a route is needed between source node and a destination node. At step 603 the identification of the source and the destination nodes are passed to BSC 106 where BSC 106 uses logic circuitry (not shown) to determine a source base station, destination base station and all intervening base stations. This is accomplished by utilizing location area information collected during location updates from nodes when they register their location with the nearest base station. BSC 106 locates the source and the destination node and then determines intervening base stations between the source and the destination nodes.

Continuing, once the source, destination, and intervening base stations are determined by BSC 106, BSC 106 instructs the base stations to broadcast a NOTIF message to all nodes within communication range of the source, destination, and intervening base stations (step 605) utilizing cellular communication channels and transmitter 303. As discussed above, this immediately causes the source node activate its ad hoc networking transceiver and to begin flooding, and all nodes that received the NOTIF message will also activate their ad hoc networking transceiver enabling them to receive and rebroadcast the flood message, and thus participate in route discovery.

Flooding eventually results in the destination base station receiving route information from the destination node (step 607). This information is passed to BSC 106 at step 609 where BSC 106 determines at least one route between the source and the destination nodes (step 611). BSC 106 provides this information to the source base station, which, in turn provides at least one route to the source node (step 613) so that communication can take place between the source and the destination nodes.

The above procedures result in only a small number of potential nodes participating in message flooding. This greatly reduces system interference. In an alternate embodiment of the present invention the above-described procedures may also be extended to include out of coverage nodes (i.e., those nodes not within any coverage area 104). In such a situation, a node that does not have cellular coverage will not be able to receive NOTIF messages from any base station directly, and would therefore be unavailable for routing. To allow such users to participate in the routing, a station out of cellular coverage would periodically wake up and listen for RT_DISC broadcasts even though it does not know the session ID to listen for. If the out of coverage station receives a RT_DISC message, it would forward the message with a special flag that would identify it as an out of coverage relay. The recipient of this RT_DISC message (with the out of coverage flag) would be responsible for forwarding this flag in subsequent RT_DISC messages that are looking for the destination node. If the destination node receives a route containing the out of coverage flag, the destination node would be responsible for letting the destination base station know about the identity of the out of coverage station. (Alternatively, the first station that receives a RT_DISC message with the out of coverage flag could assume the responsibility of informing its base station of the identity of this out of coverage station). Regardless of the approach, if BSC 106 determines that this out of coverage station should be part of the desired route between source node and the destination node, BSC 106 would request that this out of coverage station's neighbor inform the out of coverage station to participate in the ad hoc network.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method for route discovery between a source node and a destination node within an ad-hoc communication system, the method comprising:
   receiving a route discovery request from the source node;
   locating a source base station and a destination base station serving the source node and the destination node;
   determining intervening base stations between the source and the destination base stations;
   instructing intervening nodes in communication with the intervening base stations to participate in route discovery;
   receiving, by a node, a notification message instructing the node to participate in route discovery, wherein the notification message comprises a first session identification;
   receiving a route-discovery message comprising a second session identification;
   determining if the first session identification matches the second session identification; and
   forwarding the route-discovery message based on whether the first session identification matches the second session identification.

2. The method of claim 1 further comprising:
   receiving route information from the destination node;
   determining at least one route between the source and the destination node; and
   providing route information to at least one node in an ad-hoc communication system.

3. The method of claim 2 wherein determining the at least one route comprises determining a set of intervening nodes based on battery life of the intervening nodes.

4. The method of claim 1 wherein instructing intervening nodes to participate in route discovery comprises providing the intervening nodes with a session identification, instructing the intervening nodes to only forward route-discovery messages containing the session identification.

5. The method of claim 1 wherein receiving the notification message comprises receiving the notification message from a communication system that overlays an ad-hoc communication system.

6. The method of claim 5 wherein receiving the route-discovery message comprises receiving the route-discovery message from a first node within the ad-hoc communication system.

7. The method of claim 6 wherein forwarding the route-discovery message comprises forwarding the route-discovery message to a second node within the ad-hoc communication system.

8. The method of claim 1 further comprising:
   receiving a flood message;
   determining that a particular node within an ad-hoc communication system is out of cellular coverage; and
   rebroadcasting the flood message with an indication that the particular node is out of cellular coverage based on the determination that the particular node is out of cellular coverage.

9. The method of claim 8 wherein receiving the flood message comprises receiving a route-discovery message in an ad-hoc communication system.

10. An apparatus comprising:
- a receiver adapted to receive a route discovery request from a node in an ad-hoc communication system to communicate with a destination node within the ad-hoc communication system;
- logic circuitry adapted to locate a source and the destination node and adapted to determine intervening base stations between the source and the destination node;
- a transmitter adapted to transmit instructions instructing intervening nodes in communication with the intervening base stations to participate in route discovery;
- a second receiver adapted to receive a notification message instructing a node to participate in route discovery, wherein the notification message comprises a first session identification, and wherein the second receiver is further adapted to receive a route-discovery message comprising a second session identification;
- additional logic circuitry adapted to determine if the first session identification matches the second session identification; and
- a second transmitter adapted to forward the route-discovery message based on whether the first session identification matches the second session identification.

* * * * *